US008976841B2

(12) United States Patent
Arcidiacono et al.

(10) Patent No.: US 8,976,841 B2
(45) Date of Patent: Mar. 10, 2015

(54) INSTALLATION FOR THE TRANSMISSION/RECEPTION OF RADIO SIGNALS

(71) Applicants: Antonio Arcidiacono, Paris (FR); Daniele Vito Finocchiaro, Paris (FR)

(72) Inventors: Antonio Arcidiacono, Paris (FR); Daniele Vito Finocchiaro, Paris (FR)

(73) Assignee: Eutelsat S A, Paris (FR)

( * ) Notice: Subject to any disclaimer, the term of this patent is extended or adjusted under 35 U.S.C. 154(b) by 114 days.

(21) Appl. No.: 13/661,192

(22) Filed: Oct. 26, 2012

(65) Prior Publication Data

US 2013/0114644 A1    May 9, 2013

(30) Foreign Application Priority Data

Oct. 27, 2011    (FR) ..................................... 11 59759

(51) Int. Cl.
*H04B 1/00*    (2006.01)
*H04B 1/707*    (2011.01)
*H04H 60/90*    (2008.01)
*H04J 13/00*    (2011.01)
*H04N 21/61*    (2011.01)
*H04B 1/7073*    (2011.01)

(52) U.S. Cl.
CPC ............... *H04B 1/707* (2013.01); *H04H 60/90* (2013.01); *H04J 13/00* (2013.01); *H04N 21/6193* (2013.01); *H04B 1/7073* (2013.01); *H04N 21/6112* (2013.01)
USPC .......................................... 375/145; 375/141

(58) Field of Classification Search
USPC .................................................. 375/145, 141
See application file for complete search history.

(56) References Cited

U.S. PATENT DOCUMENTS

| 6,909,896 | B2* | 6/2005 | Laufer et al. ................... 455/427 |
| 2002/0004369 | A1* | 1/2002 | Kelly et al. ................... 455/12.1 |
| 2005/0068915 | A1* | 3/2005 | Atad et al. ..................... 370/316 |
| 2009/0027294 | A1* | 1/2009 | Bourry et al. .................. 343/848 |
| 2010/0054131 | A1* | 3/2010 | del Rio Herrero et al. ... 370/236 |

OTHER PUBLICATIONS

Digital DVideo Broadcasting (DVB), "Frame structure channel coding and modulation for a second generation digital terrestrial television broadcasting system (DVB-T2)," DVB Document A122, Jun. 2008.*

* cited by examiner

*Primary Examiner* — Shuwang Liu
*Assistant Examiner* — Nader Bolourchi
(74) *Attorney, Agent, or Firm* — Pillsbury Winthrop Shaw Pittman LLP

(57) ABSTRACT

A transmitting/receiving installation of microwave radio signals including a transmitting/receiving unit. The unit includes a receiving module to receive electrical signals, known as terrestrial electrical signals, issued from the transformation of radio signals received terrestrially, a module to transform the electrical signals modulated according to a spread spectrum protocol, known as satellite electrical signals, into radio signals able to be transmitted by satellite, a transmitter to transmit to a satellite of the microwave radio signals obtained after transformation of the satellite electrical signals and an amplifier to amplify the satellite electrical signals. The installation includes a box including a modulator of electrical signals according to a spread spectrum protocol and a coaxial cable connecting the transmitting/receiving unit and the box.

Figure 1:
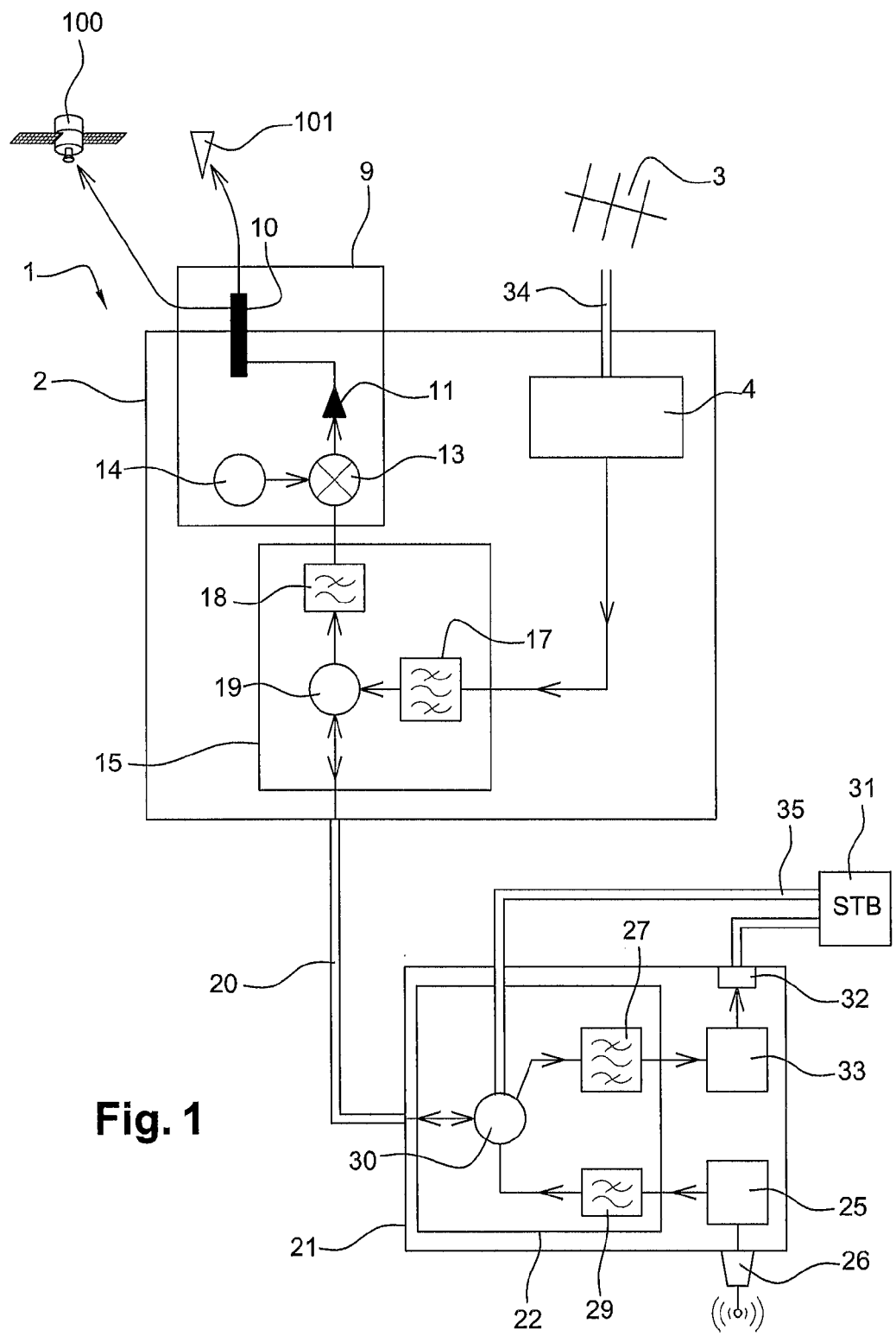

11 Claims, 2 Drawing Sheets

INSTALLATION FOR THE TRANSMISSION/RECEPTION OF RADIO SIGNALS

CROSS-REFERENCE TO RELATED APPLICATIONS

This application is based upon and claims the benefit of priority from French Patent Application No. 1159759, filed Oct. 27, 2012, the entire content of which is incorporated herein by reference.

The present invention relates to a microwave radio signal transmitting/receiving installation.

Currently, terrestrial broadcasting of digital television programs (for example according to one of the DVB-T, DVB-T2 or DVB-T2-lite standards) is widely used throughout the world. Many devices are installed with millions of users. The installed devices are mainly receiving devices that comprise an external unit including a receiving antenna (for example a receiving "rake" antenna) that transmits modulated microwave radio signals to an internal unit commonly called a digital terrestrial television decoder or else STB (Set Top Box) through the use of a coaxial cable. The decoder comprises a DVB-T or DVB-T2 demodulation block that extracts a "wanted" modulated signal in the modulated signal transmitted over the coaxial cable and demodulates the extracted "wanted" signal. The demodulated "wanted" signal may, for example, be used to display video images on a television screen.

Today terrestrial digital television program broadcasting offers are essentially purely passive, i.e., are unidirectional (one-way service).

However, it may prove to be useful to be able to offer services requiring a return link; For example, this is the case with interactive services (voting, consuming conditional access content by exchanging keys, ordering new services such as video on demand). In addition, this return link may find particularly interesting applications in the field of machine to machine or M2M communication to control certain devices (alarms, heating, etc.) and/or retrieve measured data by sensors present within homes.

A known solution to this problem consists of using a return link using an ADSL type connection provided by fixed telephony operators (STN or "Switched Telephone Network") or a connection of the GPRS/UMTS type provided by mobile telephony operators. This solution therefore requires significant and costly additional equipment as well as an additional subscription; In addition, telephone switching is not particularly suitable for transmitting short messages such as voting or ordering messages. The use of a more appropriate solution, such as DVB-RCT technology (described in European standard ETSI EN 301 958), failed due to the cost of the necessary infrastructure.

In this context, the present invention aims to provide a terrestrial microwave radio signal receiving installation that also ensures return link transmission that is effective in terms of performance, easily adaptable to preexisting installations, upgradeable and inexpensive.

For this purpose, the invention proposes a microwave radio signal transmitting/receiving installation comprising:
a transmitting/receiving unit comprising:
  means able to receive electrical signals, known as terrestrial electrical signals, issued from the transformation of radio signals received terrestrially;
  means to transform the electrical signals modulated according to a spread spectrum protocol, known as satellite electrical signals, into radio signals capable of being transmitted by satellite;
  means for transmitting to a satellite said microwave radio signals obtained after the transformation of said satellite electrical signals;
  means for amplifying said satellite electrical signals;
a box including an electrical signal modulator according to a spread spectrum protocol;
a coaxial cable connecting the transmitting/receiving unit and the box capable of:
  conveying said terrestrial electrical signals from said transmitting/receiving unit to said box;
  Conveying the electrical signals issued from said modulator according to a spread spectrum protocol from said box to said transmitting/receiving unit.

Thanks to the invention, a hybrid installation with a terrestrial broadcast link of signals to users (for example in the frequency band of between 470 and 862 MHz) and a satellite return link (frequency band for example of between 1.5 and 5 GHz, i.e., S-band frequencies, the use of this frequency band being only an example) is advantageously used.

The advantages of such an installation are multiple. A proven technology is used in broadcast forward link to users aiming to transmit large-size signals such as television signals and a satellite return link particularly enabling the user to interact with the broadcast link and transmit rather short messages, the modulation technique being based on a spread spectrum protocol such as an asynchronous multiple random access spread spectrum protocol by modulation of the SPREAD ALOHA type using interference cancellation techniques. Such a protocol is for example described in document US2010/0054131 (del Rio Herrero et al.).

The system according to the invention can be adapted very easily (and without significant additional costs) to an existing installation since the transmitting/receiving unit (preferentially outside the home) and the box (preferentially inside the home), connected to the existing coaxial cable, only need to be added. In addition, the satellite signal transmission antenna (i.e. the means to transmit microwave radio signals to a satellite) is a very inexpensive antenna that is omnidirectional or has low directivity (for example an antenna gain of less than 10 dBi). The signal transmitted by the antenna may be received by a satellite or a terrestrial "collector," depending on the frequency used.

In addition, it will be noted that the system according to the invention is very upgradeable. In fact, starting to use the system by transmitting all reverse signals to a satellite is definitely conceivable; from the point when the satellite capacity is not sufficient, the service zone or zones where most messages are sent is or are identified. Consequently, instead of directly using the antenna—satellite connection, one may provide terrestrial "collectors," i.e., ground reception stations, acting as relays and enabling the satellite load to be reduced. Signals transmitted by terminals, over an appropriate frequency, will then be received by the collectors instead of the satellite. The capacity may therefore be increased as needed, with a cost proportional to the number of terminals deployed and an incremental investment.

The terrestrial broadcasting link may be highly integrated with the satellite return link, since it may contain, in one of the multiplex signals transmitted, signaling information useful for the proper operation of the installation. This information may include the transmission parameters to be used (frequency, symbol rate, spreading code), the system load, security keys, as well as other instructions for the installation. The box therefore contains the logic necessary to interpret the information present in the terrestrial broadcasting link and to use it to drive the signal transmission. As we will see subsequently, the installation may also comprise an optional satellite broadcasting link; In this case, the signaling information may be transmitted either via the satellite signals or via the terrestrial signals.

The installation according to the invention is particularly unusual for the person skilled in the art insofar as it was difficult to imagine a terrestrial—satellite hybrid system with a satellite return link without the consequent addition of equipment leading to a prohibitive cost to the user. It is precisely the use of a specific modulation and an inexpensive antenna that makes the installation according to the invention attractive.

The transmitting/receiving infrastructure according to the invention may also present one or more of the characteristics below, considered individually or according to all technically possible combinations:

said electrical signal modulator comprises means to implement a spread spectrum protocol operating according to an asynchronous multiple random access spread spectrum protocol, possibly optimized so that the satellite hub may use interference cancellation techniques;

said means to transmit to a satellite said microwave radio signals obtained after transformation of said satellite electrical signals are an antenna that is omnidirectional or has low directivity;

said electrical signal modulator according to a spread spectrum protocol is able to modulate signals in an intermediate frequency band, said transmitting receiving unit comprising means to restore the frequency of modulated signals in said intermediate frequency band to a transmitting frequency band;

said means to restore the frequency comprise a local oscillator generating a transposition signal at an oscillation frequency able to be added to the frequencies of said intermediate frequency band;

said box comprises means to extract a clock signal from an electrical signal and means to transmit said clock signal to said means to restore the frequency such that the frequency of said clock signal is able to be added to the frequencies of said intermediate frequency band;

The installation comprises means to extract, from the terrestrial electrical signals, signaling information for the establishment of transmission parameters.

said satellite electrical signals are modulated in the transmitting frequency band known as the S band, and more specifically in the [1980 MHz; 2010 MHz] band;

said means to receive microwave radio signals transmitted terrestrially are able to receive microwave radio signals in the UHF or VHF band;

Said box includes a demodulator for said terrestrial electrical signals.

said demodulator of said terrestrial electrical signals is able to demodulate signals modulated according to the DVB-T or DVB-T2 standard;

said box comprises wireless connection means such as WiFi, WiMax, BlueTooth, ZigBee or KNX means;

said wireless connection means are able to transmit data demodulated by said demodulator and receive data to be transmitted to said modulator;

The means to transmit to a satellite said microwave radio signals are also means to transmit to a ground reception station ("collector") said microwave radio signals.

Another object of the present invention is a transmitting/receiving unit able to be integrated into an installation according to the invention comprising:

means able to receive electrical signals, known as terrestrial electrical signals, issued from the transformation of radio signals received terrestrially;

means to transform the electrical signals modulated according to a spread spectrum protocol, known as satellite electrical signals, into radio signals capable of being transmitted by satellite;

means for transmitting to a satellite said microwave radio signals obtained after the transformation of said satellite electrical signals;

means for amplifying said satellite electrical signals.

It will be noted that even if the transmitting/receiving unit is mainly described as a single device integrating all of the previously described functionalities, it may also be an arrangement of several distinct devices performing these functionalities: One may therefore consider that the means to transmit to the satellite (i.e., the antenna) are not directly integrated with the same device.

Another object of the present invention is a box able to be integrated with an installation according to the invention comprising an electrical signal modulator according to a spread spectrum protocol.

Said box advantageously comprises a demodulator of said terrestrial electrical signals.

Figure 2:
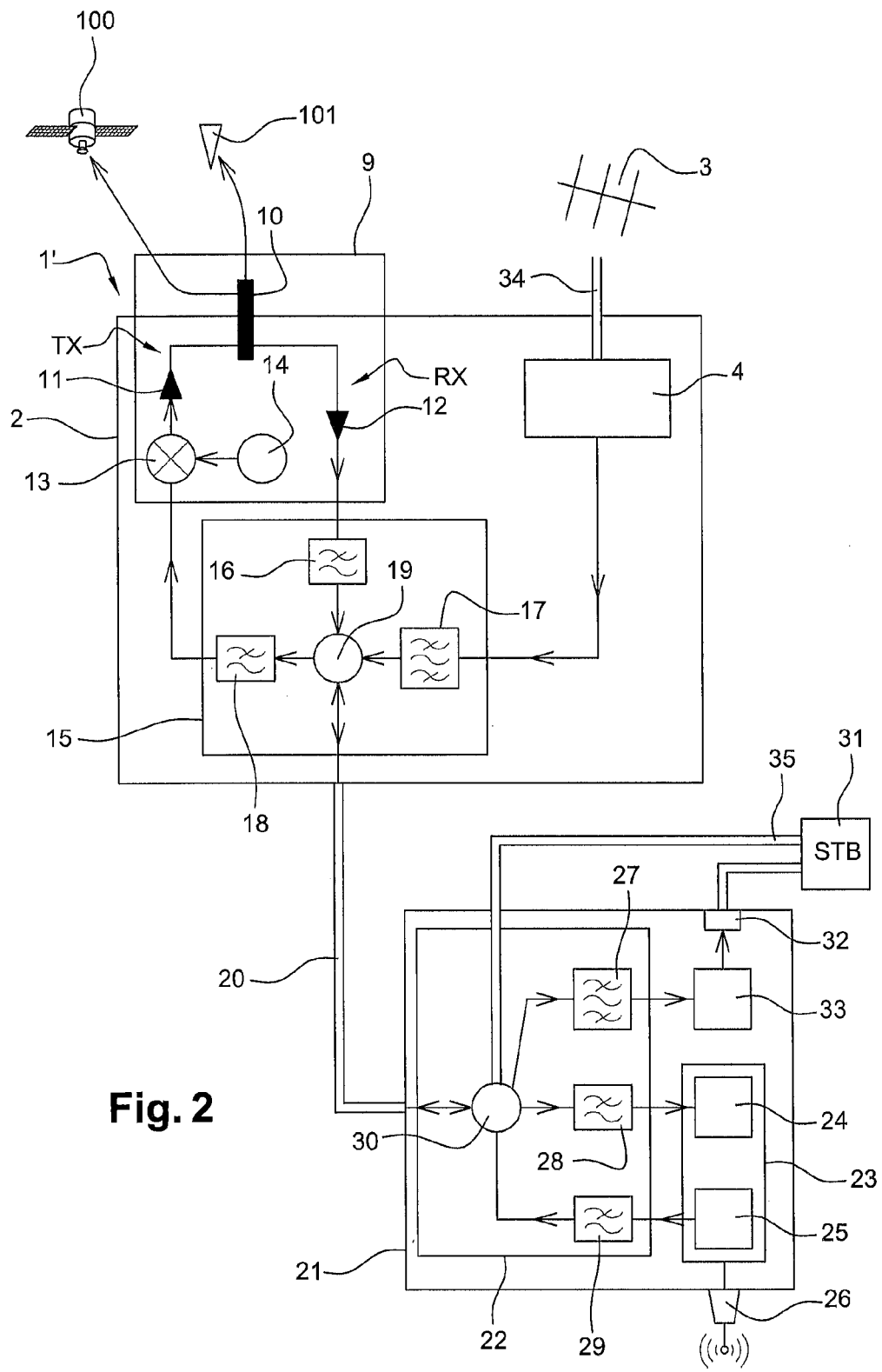

Other characteristics and advantages of the invention will clearly emerge from the description given below, for indicative and in no way limiting purposes, with reference to the attached figures, among which:

FIG. 1 schematically represents an installation according to a first embodiment of the invention;

FIG. 2 schematically represents an installation according to a second embodiment of the invention.

FIG. 1 schematically represents a transmitting/receiving installation 1 according to a first embodiment of the invention.

The transmitting/receiving installation 1 is able to operate with a standard antenna 3 (for example a "rake" antenna found on the roof of a building or home) enabling signals in UHF or VHF band comprising terrestrial digital television streams encoded according to a protocol of the DVB-T or DVB-T2 type to be received.

The transmitting/receiving installation 1 comprises:
a transmitting/receiving unit 2 outside the home;
a coaxial cable 20;
A box 21 intended to be housed inside the home.

Antenna 3 receives DVB-T or DVB-T2 signals, for example in UHF band (470-862 MHz band).

The transmitting/receiving unit 2 comprises:
input means 4 able to receive terrestrial electrical signals received by antenna 3 (the antenna and the input means 4 are for example connected by a coaxial cable 34);
a transmission block 9;
A radio signal multiplexer 15.

The transmission block 9 integrates a transmission channel TX.

More specifically, the transmission block 9 comprises
an omnidirectional or almost omnidirectional (i.e., an antenna with low directivity, for example presenting an antenna gain of less than 10 dBi) antenna 10 able to transform S-band transmission signals (for example in the [1980 MHz-2010 MHz] band) into microwave radio signals and to transmit these signals to an S-band satellite 100;
a solid state or SSPA (Solid State Power Amplifier) type amplifier able to amplify an electrical signal in the [1980 MHz-2010 MHz] frequency band to a power of between 50 mW and 1 W and then transmit this amplified signal to antenna 10; this amplifier 11 will amplify the signals intended to be transmitted in S band to satellite 100;

a local oscillator 14 generating a transposition signal at an oscillation frequency for example of 1610 MHz;

A frequency mixer 13 having a first input for receiving electrical signals in an intermediate frequency band (for example the [370 MHz-400 MHz] band) and a second input for receiving the signal generated by local oscillator 14 such that it produces an electrical signal in the [1980 MHz-2010 MHz] frequency band.

Multiplexer 15 comprises;

a low-pass filter 18 in which the output is connected to the input of the frequency mixer 13 and the input is connected to a microwave coupler 19; the low-pass filter 18 here allows frequencies lower than 400 MHz (therefore the frequencies in the intermediate frequency band that we will discuss subsequently) to pass;

a band-pass filter 17 in which the output is connected to coupler 19 and the input is connected to the output of the input means 4 able to receive the terrestrial electrical signals received by antenna 3; The band-pass filter 17 allows frequencies of between 470 and 862 MHz (in the frequencies in the UHF band) to pass.

Box 21 comprises:

a demultiplexer 22;

a modulator 25 operating for example according to an asynchronous multiple random access spread spectrum protocol by modulation of the SPREAD ALOHA type optimized so that the satellite hub may use interference cancellation means (such a protocol is for example described in document US2010/0054131 (del Rio Herrero et al.));

means 26 to wirelessly connect to a local network of the WiFi, WiMax, BlueTooth, ZigBee or KNX type, or wire connection means to a local network of the Ethernet or similar type;

an input/output connection 32 of the USB type able to output signals to a digital television decoder 31 also called STB (Set Top Box);

a demodulator 33 operating according to the DVB-T standard (described in the ETSI EN 300 744 "Digital Video Broadcasting (DVB); Framing structure, channel coding and modulation for digital terrestrial television" standard) or DVB-T2 (described in the ETSI EN 302 755 "Digital Video Broadcasting (DVB); Frame structure channel coding and modulation for a second generation digital terrestrial television broadcasting system (DVB-T2)" standard, extensions of the DVB-T2 standard such as DVB-T2-lite being described in the "DVB BlueBook A122").

Demultiplexer 22 comprises:

a low-pass filter 29 in which the output is connected to a microwave coupler 30 and the input is connected to the output of modulator 25; here the low-pass filter 29 allows frequencies under 400 MHz (intermediate frequencies) to pass;

a band-pass filter 27 in which the input is connected to coupler 30 and the output is connected to demodulator 33 able to supply decoder 31; The band-pass filter 27 allows frequencies of between 470 and 862 MHz (in the UHF band) to pass.

Coaxial cable 20 connects box 21 via its demultiplexer 22 and the transmitting/receiving unit 2 via its multiplexer 15.

The operating principle of installation 1 according to the invention is based on the use of a receiving part (no transmission) by terrestrial link formed by "rake" antenna 3 and input means 4 able to receive the terrestrial electrical signals received by antenna 3 and an S-band transmitting part formed by transmission block 9. The S-band transmitting part constitutes a return link enabling the placement of interactive services (votes, consumption of conditional access content by exchanging keys, orders for new services such as video on demand) or M2M services (controlling domestic appliances, surveillance, monitoring a parameter measured by a sensor) with the addition of relatively limited and inexpensive equipment to an existing installation. Omnidirectional antenna 10 enables S-band signals to be transmitted either directly to satellite 100 or to terrestrial collectors 101 in the event of an increase in capacity (in this case, antenna 10 preferentially should be slightly directional so as to reach collector 101).

All signals are multiplexed on single coaxial cable 20.

The terrestrial signals received by antenna 3 and then input means 4 are transmitted by multiplexer 15 over coaxial cable 20 after filtering by band-pass filter 17. These signals are then recovered at the microwave coupler 30 of demultiplexer 22 and filtered by band-pass filter 27 before being transmitted to DVB-T or DVB-T2 demodulator 33 and then to STB 31 via output USB 32, and/or in parallel directly to STB 31 via coaxial cable 35.

The S-band signals to be transmitted are modulated by modulator 25 over the intermediate frequency band (here [370 MHz-400 MHz] given only for illustrative purposes) and are transmitted over coaxial cable 20 by demultiplexer 22 after having been filtered by low-pass filter 29. They are then transposed in frequency to the S band in transmission and amplified by amplifier 11. It will be noted that the intermediate frequency band is chosen so as to limit losses on the coaxial cable. If the length of the cable is limited, it would however be possible to transmit the signals directly over the coaxial cable over the [1980 MHz-2010 MHz] band without using the intermediate frequency band since the frequency bands used respectively for the S band in forward and return link and for the UHF band are disjointed, therefore preventing interference between the signals transmitted over the same cable.

However, the intermediate frequency band chosen presents the advantage of being compatible with the bandwidth of a standard coaxial cable.

The forward link of UHF terrestrial reception also enables useful information to be recovered. For example, this may be the frequency or bandwidth that will be used in the return S band link. It may also be updates connected to the modulation/demodulation used by modem 23. A very stable clock signal (i.e., with a frequency error of less than 1 kHz) may also be recovered: This clock signal may then be transmitted to the transmitting/receiving block in order to be used for frequency transposition instead of the less-precise local oscillator. In other words, the forward terrestrial broadcasting link may be highly integrated with the satellite return link since the multiplex signals transmitted terrestrially may contain signaling information useful for the proper operation of the installation. This information may include the transmission parameters to be used (frequency, symbol rate, spreading code), the system load, security keys, as well as other instructions for the installation. The box therefore contains the logic necessary to interpret the information present in the terrestrial broadcasting link and to use it to drive the signal transmission. The last point assumes that the box comprises means (not represented) to extract signaling information used to establish the return link transmission parameters present in part of the terrestrial electrical signals.

A second particularly interesting application of the installation according to the invention relates to the M2M domain. In this case, the S band return link may be used to transmit information coming from an apparatus found in the home such as an alarm system; thus, when the alarm system is triggered, a signal is transmitted by the alarm system to wireless connection means 26 (for example means operating in ZigBee) and a message indicating the initiation of the alarm is transmitted over the S band return link.

FIG. 2 schematically represents a transmitting/receiving installation 1 according to a second embodiment of the invention.

Installation 1' of FIG. 2 comprises all of the elements of installation 1 of FIG. 1 referenced identically: The description of these elements such as done with reference to FIG. 1 also applies to the common elements of installation 1' of FIG. 2 and will not be repeated in the following text.

Installation 1' of FIG. 2 is differentiated from that of FIG. 1 in that it also comprises a satellite forward link (receiving link) in addition to the terrestrial forward link.

To do this, the transmission block 9 becomes a transmitting/receiving block 9 integrating a receiving channel RX; More specifically, antenna 10 is also adapted for the reception of microwave radio signals transmitted by the satellite in S band transmission (for example in the [2170 MHz-2200 MHz] band) and the transmitting/receiving block 9 also comprises a low noise amplifier 12 to amplify the electrical signal representative of the radio wave received in reception S band coming from antenna 10.

Multiplexer 15 also comprises a high-pass filter 16 in which the output is connected to coupler 19 and the input is connected to the output of low noise amplifier 12; The high-pass filter 16 allows frequencies greater than 2170 MHz (therefore frequencies in the reception S band) to pass.

Box 21 also comprises a modem 23 integrating modulator 25 operating for example according to an asynchronous multiple random access spread spectrum protocol by modulation of the SPREAD ALOHA type optimized so that the satellite hub may use interference cancellation means (such a protocol is for example described in document US2010/0054131 (del Rio Herrero et al.)); and a demodulator 24, operating according to the DVB-SH standard (ETSI EN 302 583 Digital Video Broadcasting (DVB); Framing structure, channel coding and modulation for Satellite Services to Handheld devices (SH) below 3 GHz, January 2008).

Demultiplexer 22 also comprises a high-pass filter 28 in which the input is connected to coupler 30 and the output is connected to the input of demodulator 24; The high-pass filter 28 allows frequencies greater than 2170 MHz (reception S band) to pass.

The operating principle of installation 1' according to the invention is based on the use of a terrestrial receiving (no transmitting) part and an S band transmitting/receiving part formed by the transmitting/receiving block 9. The operation of the receiving part by radio and the transmitting part by block 9 is identical to that presented with reference to FIG. 1.

All signals are multiplexed on single coaxial cable 20.

For the receiving part of block 9, the satellite signals received in S band (here the [2170 MHz-2200 MHz] band) are directly (without frequency modification) transmitted, after amplification by amplifier 12, over coaxial cable 20 by multiplexer 15 after filtering via high-pass filter 16 and passage by microwave coupler 19. These signals are then recovered at the microwave coupler 30 of demultiplexer 22 and then filtered by the high-pass filter 28 before being transmitted to demodulator DVB-SH 24.

It will be noted that the intermediate frequency band is not used for signals received in S band, the frequency of the latter being directly compatible with the bandwidth of cable 20. Even if the installation according to the invention advantageously uses the S band in transmission, installation 1' according to the invention also enables use of the S band in reception.

It will also be noted that, according to the embodiment of FIG. 2, the forward link of S band satellite reception enables (like the forward link of terrestrial reception) signaling information present in the satellite signal to be recovered. The last point assumes that the box comprises means (not represented) to extract signaling information used to establish the return link transmission parameters present in part of the satellite signals received in S band.

Of course, the invention is not limited to the embodiment that has just been described.

Therefore, the invention was more specifically described in the case of utilization in S band but it may also be used in C band.

The invention claimed is:

1. A transmitting/receiving installation for microwave radio signals comprising:
    a transmitting/receiving unit comprising:
        a receiver configured to receive terrestrial electrical signals issued from a transformation of radio signals received terrestrially;
        a frequency shifter configured to transform satellite electrical signals modulated according to a spread spectrum protocol into radio signals capable of being transmitted to a satellite;
        a transmitter configured to transmit to a satellite microwave radio signals obtained after the transformation of said satellite electrical signals and is further configured to transmit said microwave radio signals to a ground station;
        an amplifier configured to amplify said satellite electrical signals;
    a box including an electrical signal modulator according to the spread spectrum protocol, the electrical signal modulator being further configured and arranged to modulate signals in an intermediate frequency band and wherein the frequency shifter is further configured and arranged to the transform modulated signals in said intermediate frequency band to a transmitting frequency band;
    the box further comprising:
        a demultiplexer configured and arranged to extract from terrestrial electrical signals, signaling information for establishing transmission parameters to be used by the transmitting/receiving unit;
        a clock signal demultiplexer configured to extract a clock signal from an electrical signal and a transmitter to transmit said clock signal to said frequency shifter such that the frequency of said clock signal is able to be added to the frequencies of said intermediate frequency band;
    a coaxial cable configured to connect the transmitting/receiving unit and the box, the coaxial cable adapted to:
        convey said terrestrial electrical signals from said transmitting/receiving unit to said box, and
        convey electrical signals issued from said modulator according to the spread spectrum protocol from said box to said transmitting/receiving unit.

2. The transmitting/receiving installation according to claim 1, wherein said electrical signal modulator is configured to implement the spread spectrum protocol operating according to an asynchronous multiple random access spread spectrum protocol.

3. The transmitting/receiving installation according to claim 1, wherein the transmitter to transmit to a satellite said microwave radio signals obtained after transformation of said satellite electrical signals is an antenna that is omnidirectional or that presents low directivity.

4. The transmitting/receiving installation according to claim 1, wherein said frequency shifter comprises a local oscillator configured to generate a transposition signal at an oscillation frequency able to be added to the frequencies of said intermediate frequency band.

5. The transmitting/receiving installation according to claim 1, wherein said satellite electrical signals are modulated in the transmission frequency S band.

6. The transmitting/receiving installation according to claim 1, wherein said receiving unit configured to receive microwave radio signals transmitted terrestrially is configured to receive microwave radio signals in the UHF or VHF band.

7. The transmitting/receiving installation according to claim 1, wherein said box includes a demodulator of said terrestrial electrical signals.

8. The transmitting/receiving installation according to claim 1, wherein said box comprises a wireless connector or a wire connector.

9. The transmitting/receiving installation according to claim 5, wherein said satellite electrical signals are modulated in the [1980 MHz-2010 MHz] band.

10. The transmitting/receiving installation according to claim 7, wherein said demodulator is configured to demodulate signals modulated according to the DVB-T, DVB-T2 or VB-T2-lite standard.

11. The transmitting/receiving installation according to claim 8, wherein the wire connector is Ethernet.

\* \* \* \* \*